(12) United States Patent
Ruttanasupa et al.

(10) Patent No.: US 10,656,120 B2
(45) Date of Patent: May 19, 2020

(54) MOVABLE DETECTOR AND METHODS FOR INSPECTING ELONGATED TUBE-LIKE OBJECTS IN EQUIPMENT

(71) Applicant: RAYONG ENGINEERING AND PLANT SERVICE CO., LTD., Bangkok Metropolis (TH)

(72) Inventors: Pawin Ruttanasupa, Rayong Province (TH); Terdsak Yananont, Rayong Province (TH); Santipap Umpawanwong, Rayong Province (TH); Paisal Pandum, Rayong Province (TH); Kanjanas Seanbunsiri, Rayong Province (TH)

(73) Assignee: Rayong Engineering and Plant Services Co., LTD, Bangkok Metropolis (TH)

( * ) Notice: Subject to any disclaimer, the term of this patent is extended or adjusted under 35 U.S.C. 154(b) by 0 days.

(21) Appl. No.: 15/755,306

(22) PCT Filed: Jan. 16, 2017

(86) PCT No.: PCT/TH2017/000001
§ 371 (c)(1),
(2) Date: Feb. 26, 2018

(87) PCT Pub. No.: WO2017/123166
PCT Pub. Date: Jul. 20, 2017

(65) Prior Publication Data
US 2018/0306749 A1    Oct. 25, 2018

(30) Foreign Application Priority Data

Jan. 15, 2016 (NL) ...................................... 2016102

(51) Int. Cl.
*G01N 27/82* (2006.01)
*G01M 3/40* (2006.01)
(Continued)

(52) U.S. Cl.
CPC .............. *G01N 27/82* (2013.01); *G01M 3/40* (2013.01); *G01N 21/952* (2013.01);
(Continued)

(58) Field of Classification Search
CPC ...... G01M 3/40; F16L 2101/30; G01N 27/82; G01N 2223/628; G01N 21/9515;
(Continued)

(56) References Cited

U.S. PATENT DOCUMENTS

| 4,843,884 A * | 7/1989 | House ..................... G01N 29/26 73/622 |
| 2009/0038398 A1 * | 2/2009 | Lavoie ................. G01N 29/225 73/637 |

(Continued)

*Primary Examiner* — Huy Q Phan
*Assistant Examiner* — Dustin R Dickinson
(74) *Attorney, Agent, or Firm* — Troutman Sanders LLP

(57) ABSTRACT

The invention relates to an apparatus and a method for inspecting an elongated tube-like object. The apparatus comprises a body (1, 2) for moving along the elongated tube-like object by clamping the object; and a sensor frame (15, 15b, 15c) supporting one or more sensors (20) for measuring a state indication property. One or more one or more body-to-sensor-frame connections (39, 40, 43, 72b, 72c) connect the sensor frame (15, 15b, 15c) to the body (1, 2), wherein the one or more body-to-sensor-frame connections (39, 40, 43, 72b, 72c) are arranged to allow an adjustable relative position between the sensor frame and the body, while the sensor frame can position itself with respect to the tube.

14 Claims, 10 Drawing Sheets

(51) Int. Cl.
G01N 21/952 (2006.01)
G01N 21/95 (2006.01)
G01N 29/265 (2006.01)

(52) U.S. Cl.
CPC ....... *G01N 21/9515* (2013.01); *G01N 29/265* (2013.01); *G01N 2021/9518* (2013.01); *G01N 2291/02854* (2013.01); *G01N 2291/262* (2013.01); *G01N 2291/269* (2013.01)

(58) Field of Classification Search
CPC ............. G01N 21/952; G01N 21/9518; G01N 29/265; G01N 2291/02854; G01N 2291/262; G01N 2291/269; G01N 2291/2634
See application file for complete search history.

(56) References Cited

U.S. PATENT DOCUMENTS

| | | | |
|---|---|---|---|
| 2010/0275694 A1 | 11/2010 | Roberts | |
| 2012/0215348 A1 | 8/2012 | Skrinde | |
| 2012/0306483 A1* | 12/2012 | Boenisch | G01N 27/9033 324/239 |
| 2014/0260705 A1* | 9/2014 | Kimpel, Jr. | G01M 99/00 73/865.8 |
| 2016/0238565 A1* | 8/2016 | Gonzalez | G01N 29/2487 |

* cited by examiner

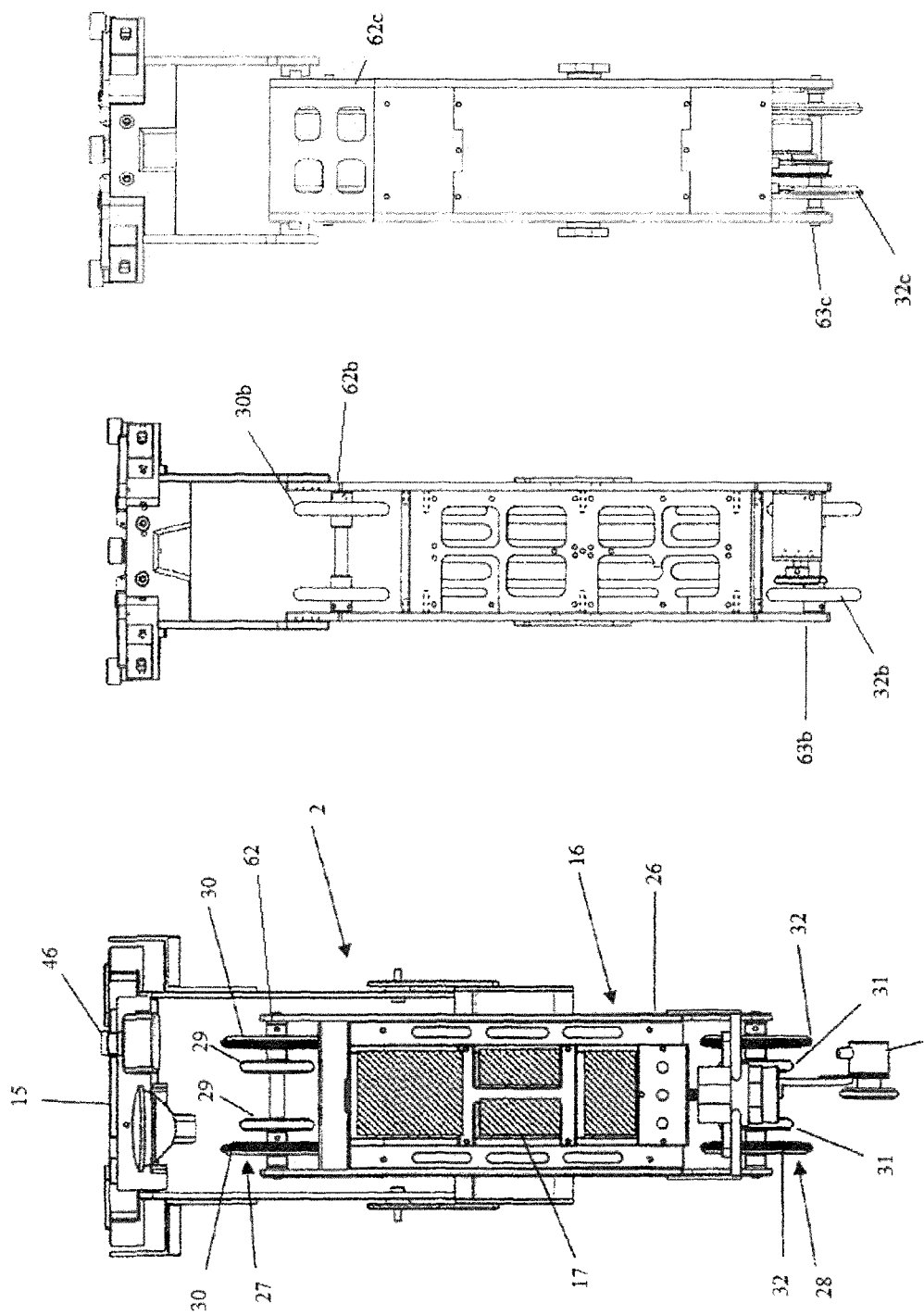

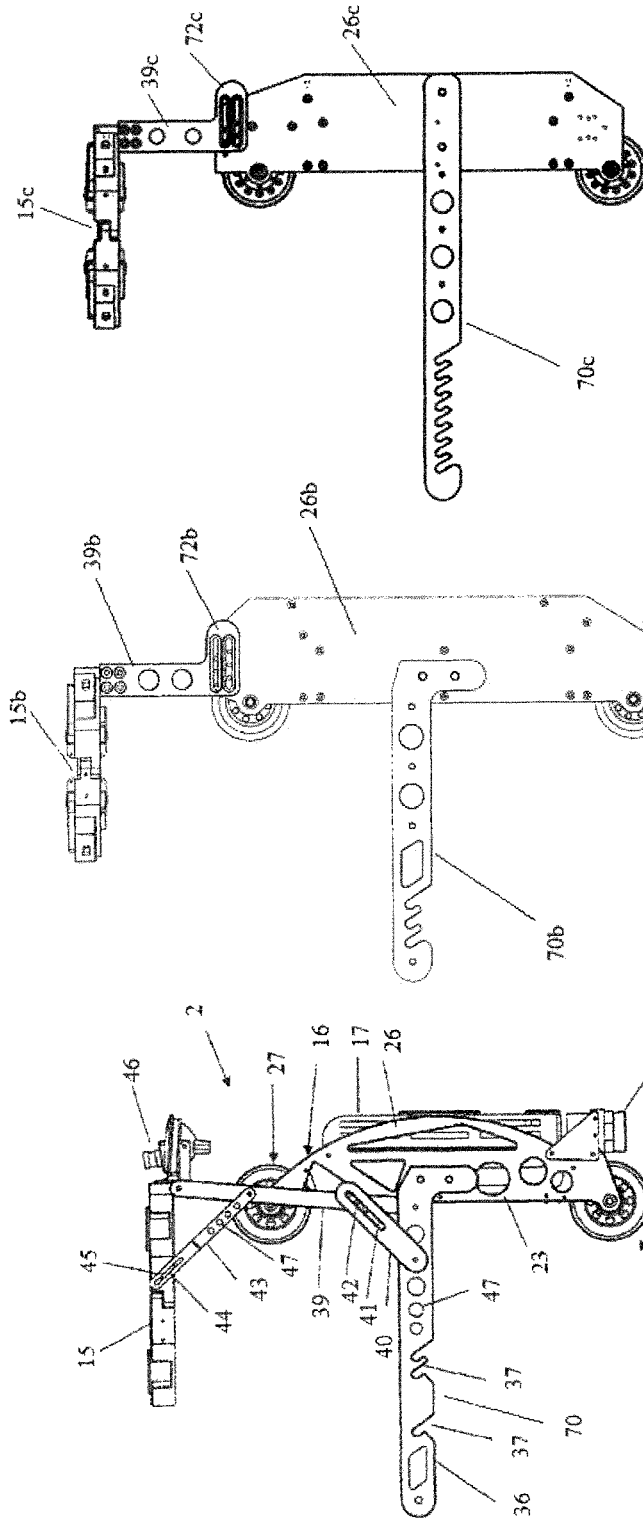

$F_1, F_2 > F_3, F_4$

MOVABLE DETECTOR AND METHODS FOR INSPECTING ELONGATED TUBE-LIKE OBJECTS IN EQUIPMENT

CROSS-REFERENCE TO RELATED APPLICATIONS

This application is a U.S. 371 National Stage entry of International Application Serial No. PCT/TH2017/000001 filed Jan. 16, 2017, which claims priority to Netherlands Application No. 2016102 filed Jan. 15, 2016. The contents of each of these applications are hereby incorporated herein by reference in their entirety as if set forth verbatim.

TECHNICAL FIELD

The invention relates to an apparatus or movable detector and the method for inspecting elongated tube-like objects in an equipment, such as tubes, pipes or coils. The invention also relates to program code for identification of a status property (e.g. expected remaining life time) of an elongated tube-like objects, such as pipes or coils.

BACKGROUND ART

Elongated tube-like objects, such as a pipe or a coil need to be investigated for leakage. Elongated tube-like objects, such as pipes, (radiant) coils or tubes, can require inspection on its outer surface. In some cases inspection is necessary during operation. Inspection can comprise measuring a status property that can be used to calculate a status property.

To estimate the remaining lifetime of coils/pipes a sensor can check the thickness of carburization diffused in the coils/pipes, which are used in furnaces of Olefins production for evaluating the remaining life time. The invention can be applied to any combustion chambers for cracking hydrocarbon. In an example the amount of carbon of each coil is measured. Carbon will seep into the metal due to the combustion process. The measure value is called "Carburization" which is unit less. It is about the changing of magnetic intensity and has been developed and patented this measurement by Kubota company. Factors that can be used to determine the lifetime are the "Carburization" and "Creep calculation" (Material damage theory).

Reference is made to U.S. Pat. No. 5,128,613, which is included by reference in its entirety. Any of the indicated sensors, read-out and processing devices mentioned in U.S. Pat. No. 5,128,613 can be combined with any of embodiments of the current invention. Any of the measured values mentioned therein can be used as status indication values in the current application.

In an example carburization in a tube or a pipe is measured. In an example radiation, e.g. magnetic, is used to measure a pipe property to allow calculating the pipe thickness. Such data is then recorded in a data check sheet. The recorded data is evaluated to establish the coil's/tube's condition, which allows estimating the remaining life time for that tube or tube section.

To allow detection, scaffolding for working at high level, for example 12 meters, needs to be installed. Operators have to work at the high level, in confined space and there can be a lot of coke dust mixed in the air. Therefore, it may cause problems of safety and health to operators. Moreover, installing scaffolding results in costs and takes time. Further time is needed for work preparation and it will take time to check the results of the measured values.

Investigation of equipment, such as pipes, has been disclosed in U.S. Pat. No. 5,698,854 that relates to an apparatus and a method for inspecting and measuring pipe thickness. Operators can measure a thickness of carburization of each coil by using a handheld device, see U.S. Pat. No. 5,128,613 A.

Moreover, elongated tube-like object investigation such as pipes has been disclosed in US Patent Application No. US 2009/0120215A1 related to scanning system for pipes by used the movable detector and method to maintain the position of movable detector which moves on the pipes to ensure the integrity of pipes.

US2010/0275694 A1 discloses a pipe scanner comprising a collar, axial drive and circumferential scanning drive. The scanning drive can travel around the outer circumference of the collar. One disadvantage of such scanners is that the collar is sized to fit around the circumference of the pipe. Accordingly, the user is bound to obtain a circular collar having the right dimensions (e.g. diameter) to fit the pipe. This is inconvenient in terms of time and moneywise. Moreover, it is impossible or inconvenient to obtain measurements from bended, convex pipes or pipes with an uneven surface.

US2012/0215348 A1 relates to a vehicle having a frame module and a track tool. The track tool is fitted to the frame module and provides work platform stability and propulsion for axial transit. The sensor frame supports sensors for measuring.

The apparatuses and methods in the prior art suffer from a problem caused by irregularities on the surface of the elongated tube-like object, such as bent, convex, etc. These irregularities cause errors in the measurement and create difficulties for interpreting the measured data.

FEATURES AND PROPOSES OF INVENTION

It is therefore an objective to solve a problem in measuring data along an elongated tube-like object which has surface irregularities. In particular the tube-like object can be bended.

A first objective of the invention relates to an apparatus mounted around an elongated tube-like object for inspecting said elongated tube-like object, the apparatus comprising a body for moving along the elongated tube-like object by clamping an outside surface of the tube-like object, a sensor frame comprising one or more sensors for measuring one or more state indication properties of the tube-like object; and one or more body-to-sensor-frame connections for connecting the sensor frame to the body. According to the invention the one or more body-to-sensor-frame connections are arranged to allow an adjustable relative position between the sensor frame and the body and the one or more body-to-sensor-frame connections are arranged to allow maintaining a position of the one or more sensors with respect to the tube-like object.

Accordingly an apparatus is provided that can move along the outer surface of the tube-like object to measure properties of that tube-like object along its length. The apparatus engages the tube-like object by clamping, such that it can climb along the tube. To clamp the tube-like object, the apparatus engages the tube-like object, e.g. from different sides including its opposite sides. To climb the tube-like object, the apparatus can have one or more wheels. The one or more state indication properties that is/are measured can be used to e.g. determine the remaining lifetime of the coil/pipe. An exemplary embodiment uses/determines/measures carburization of the coils/pipes as a state indication property.

Accordingly, the invention provides an apparatus that has a sensor frame having one or more sensors, which sensor frame is on the one hand positioned with respect to the body via the body-to-sensor-frame connection and that is on the other hand positioned with respect to the tube. The position that the sensor frame will have, will, in use, depend on the position of the body to which it is connected via the connection and on the position of the tube, which it engages. The position that the sensor frame will have with respect to the tube is in accordance to a certain relationship. The sensor frame can be self-centered. This allows the apparatus to follow curves in tubes, while maintaining the sensors at a certain position, e.g. a certain distance, from the curved tube. The body will move the apparatus along the tube and thereby move the body-to-sensor-frame connection along the tube. However the body-to-sensor-frame connection does not fully fix the position of the sensor frame to the body as the body-to-sensor-frame connection is arranged to allow at least one degree of freedom of the sensor frame and thereby also the sensor, with respect to the body. This allows limited movement of the sensor frame with respect to the body and this movement allows positioning the sensor frame such that a certain relationship, e.g. distance, is held between sensor and tube.

In an embodiment the sensor frame has positioning means for maintaining a relationship between the one or more of the sensors and the tube constant. The relationship can be a distance. The positioning means allow maintaining a constant distance between the tube-like object and the one or more sensors. Preferably the constant distance is held in a radial direction with respect to the tube. In this way the instability of the sensor(s) is prevented. The positioning means for arranging the predetermined distance can be one or more biasing elements, preferably one or more springs.

In an embodiment a positioning unit, which can comprise the positioning means, is provided that allows positioning the sensor frame with respect to the tube. The sensor frame can be held by the positioning unit at a predetermined position from the outer surface of the tube-like object. The position is held even at a curved tube or at a tube with an uneven outer surface. The one or more body-to-sensor-frame connections allow the sensor and sensor frame to move in at least one degree of freedom, such that the sensor frame can be moved with respect to the body in a position in which the sensor is held at a certain position with respect to the tube-like object.

In an embodiment the positioning unit includes means to hold the sensor frame in a predetermined position to the elongated tube-like object, e.g. self-centering means. E.g. by clamping the tube from three or more sides, a self-centering configuration is obtained in which the clamping configuration will guide the sensor frame to a predetermined position with respect to the axis of the tube.

In an embodiment the body-to-sensor-frame connections are arranged to hold the sensor frame at a distance from the body, preferably in front of or behind of the body in a first or driving direction of the apparatus. The first direction is a direction along the tube. The body can be moved in that first direction along the elongated tube-like object. The body-to-sensor-frame connection makes the sensor frame follow the position in the first direction. Even at a curved tube or a tube with an uneven outer surface, the sensor frame can be held and pushed/moved by the body-to-sensor-frame connections.

In an embodiment, the body-to-sensor-frame connections provide that the sensor frame is rotationally locked with respect to the body. In an embodiment the body-to-sensor-frame connections are arranged to allow the sensor frame to move perpendicular to the first direction, so as to allow the apparatus to pass a bent in the elongated tube-like object.

A tilting connection can be part of the body-to-sensor-frame connection. By tilting the sensor frame in a self-centered position in relation to the bent of a pipe, the sensor frame is allowed to follow that bent while maintaining a fixed relationship to the tube. In embodiments the body-to-sensor-frame connections include one or more slits, which can comprise two or more slits that are perpendicular to each other. By providing the body-to-sensor-frame with a first slit, a sliding relationship is obtained, allowing one degree of freedom between the sensor frame and the body. E.g. a slit extending in a direction generally perpendicular to the clamped tube is provided. A second slit, e.g. perpendicular to a first slit, can be provided to provide a second degree of freedom. The second slit can also extend in a direction perpendicular to the tube direction.

In an embodiment, the sensor unit comprises, e.g. as part of the positioning unit, an elongated tube-like object engaging element, such as one or more biasing elements, preferably one or more springs, for asserting biasing or restoring force against an elongated tube-like object. In this way, even though there are irregularities on the surface of the elongated tube-like object, the distance between one or more sensors and the elongated tube-like object can be maintained.

In an embodiment two or more elongated tube-like object engaging elements are provided at different positions on the frame, engaging the tube-like object at different locations. Preferably the location include at least two opposing sides of the tube-like object. This allows engaging the tube-like object from different sides.

Preferably the elongated tube-like object engaging elements comprise a biasing element for exerting a force onto the surface of the tube-like object. This will result, if the tube-like object is clamped from multiple sides, in a clamping force onto the tube-like object. By the elongated tube-like object engaging elements being connected to the sensor frame, the frame is positioned with respect to the elongated tube-like object.

In an embodiment several sensors are mounted on the sensor frame. Preferably two, three, four or more sensors are mounted on the sensor frame. In an embodiment a sensor is part of a sensor unit. The sensor unit can comprise a magnet and a magnetic sensor. The sensor unit can comprise any sensor that can provide information about the condition of the surface of the tube-like object, e.g., an ultrasonic sensor, an eddy current sensor, a video camera, camera, an x-ray unit, etc. The sensor can comprise a memory, such as an SD card, on to which measured data, such as the state indication property, is stored.

In an embodiment wherein the engaging elements position the sensors with respect to the elongated tube-like elements and wherein the engaging elements are on, different, preferably opposite, sides engaging constellation, the sensor frame can move with respect to the different sensors. In this embodiment the sensor frame positions (e.g. by locking the sensor frame around the tube-like object) the sensors generally with respect to each other, while the tube-like object engaging elements positions the sensors at a predetermined distance from the tube surface. The sensors can be moved e.g. along a single axis with respect to the sensor frame, in particular moved with one degree of freedom. The opposite sides' constellation also allows cancelling out of the outward biasing forces exerted on the tube surface by the biasing elements. Such a constellation, e.g with three, four, five, six or more sensors and tube-like object engaging elements result in a self-centered or 2-d stabilized sensor frame.

In an embodiment the body for moving along the tube-like object comprises a drive for moving. The body can comprise a clamping device for engaging the tube-like object on the outside. The clamping is such that moving along the pipe is possible. The clamping device can comprise adaptation means to adapt the clamping to different sized pipes. While climbing the tube-like object the apparatus can have a constant speed, in particular said constant speed can be 3.5 m/min.

In an embodiment, a magnet element is mounted on the sensor frame for generating a magnetic field, and, the one or more sensors are arranged to measure a change in the magnetic field. The magnet element may be a permanent magnet or an electromagnet. The change in the magnetic field represents the state indication properties, such as carburization. The sensor may comprises a voltage meter for measuring a voltage difference representing the change of the magnetic field, such as a voltage difference produced by Hall effect.

A second aspect of the invention relates to a method for inspecting an elongated tube-like object, the method comprising:

inspecting a tube-like object using an apparatus that is clamped onto the tube-like object;

driving the apparatus along the elongated tube-like object;

positioning one or more sensors for tube inspection by connecting the sensor to the driven apparatus for following the driving along the elongated tube-like object and on engaging the tube to maintain a distance between the sensor and the elongated tube-like object.

Accordingly the position of the sensor is maintained with respect to the tube because a relationship between sensor frame and tube is maintained, while that same sensor frame is being moved along the tube driven by the apparatus that clamps onto the tube.

The apparatus may be embodied in a movable detector and method for inspecting an elongated tube-like object, such as coils, pipes or tubes that is part of elongated tube-like object. The equipment can be part of furnaces for the production of olefins or tubes in the boilers of paper production and so on. The detector and method for inspection comprises measuring a property of the equipment, such as coils or tubes, which property can be used to provide an equipment state indication for the state of the equipment, coils and/or tubes. A possible state indication can be the remaining life time. In an embodiment the amount of carbon in coils or tubes is monitored, which allows estimating a remaining life time of the coil or tube.

According to an aspect of the invention a movable detector and a method for inspecting the equipment in which equipment can be inspected at various locations along the coils or tubes during operation. Detection comprises moving the detector along the coils/tubes. The detector and method allow detection of an equipment state indication. In an embodiment carburization is measured using a sensor that is held at a predetermined distance from the tube during detection. The distance is maintained between surface of elongated tube-like object which is to be inspected and a sensor while moving the detector along the tube or coils. Maintaining the distance constant during detection continuous measurement at similar circumstances, e.g. also when the surface of equipment is bent, convex or rough and also gives precise information quickly without cost and time of scaffolding installation. Operators do not have to work in a confined space and in the area with a lot of coke dust mixed in the air. This could eliminate safety and health problems of operators in case of coils investigation in the furnaces of olefins production.

In an embodiment the movable detector for inspecting the elongated tube-like object comprises a first part, such as a driving part, for moving along the equipment which is to be inspected; and a second part, such as a controlling and monitoring part, to control the movement of driving part and arranged for inspection, measurement and evaluation of measured data.

The two parts of the movable detector can be assembled over the elongated tube-like object which is to be inspected. The two parts can be connected to each other using an adjustable connection. The adjustable connection is scalable according to the size of elongated tube-like object. The adjustable connection allows adapting the distance at which the two parts of the movable detector are held with respect to each other. This distance is dependent on the size of the tube or coil that is inspected. In an embodiment the distance can be varied in use.

The movable detector is provided with a sensor device. The sensor device is mounted on a sensor frame that is arranged for preventing instability of inspection while moving. The sensor is arranged for inspecting the elongated tube-like object and send signals to computer for presenting the data instantly (real time). In another embodiment measured data is stored in a storage medium, such as a SD Card. (secured digital card)

Another feature of this invention provides software for controlling the apparatus and/or for obtaining and processing data obtained by measurement of a sensor that moves along a tube-like object.

In an embodiment the robot is just used to measure data. The lifetime estimation is calculated by software on a computer that receives the measured data, e.g. over a wireless connection with the robot or by connecting an SD card with recorded data to the computer with software.

BRIEF DRAWING DESCRIPTIONS

Figure 3C:
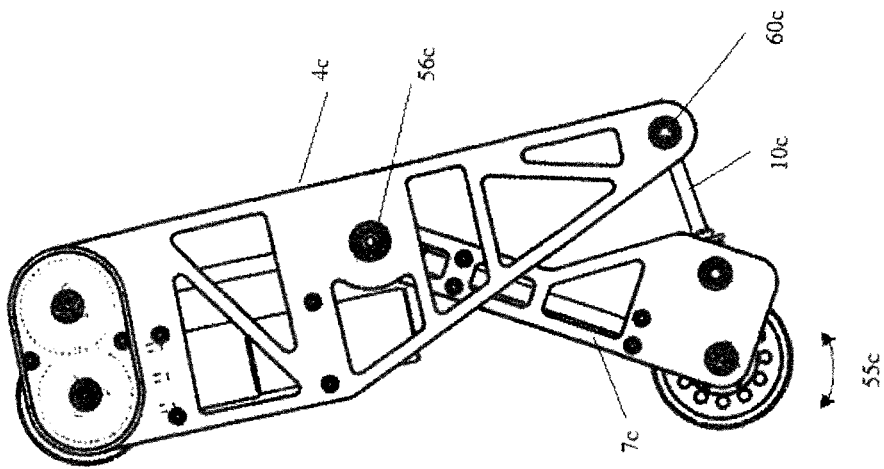
Figure 3B:
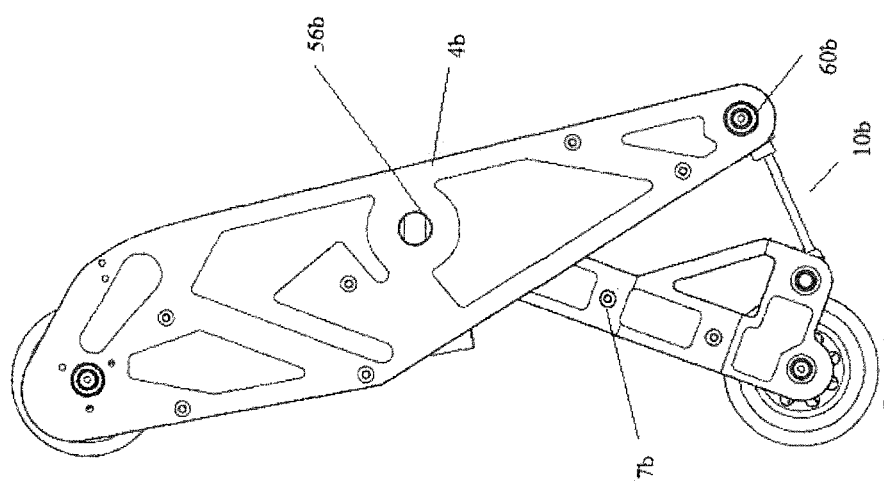
Figure 3A:
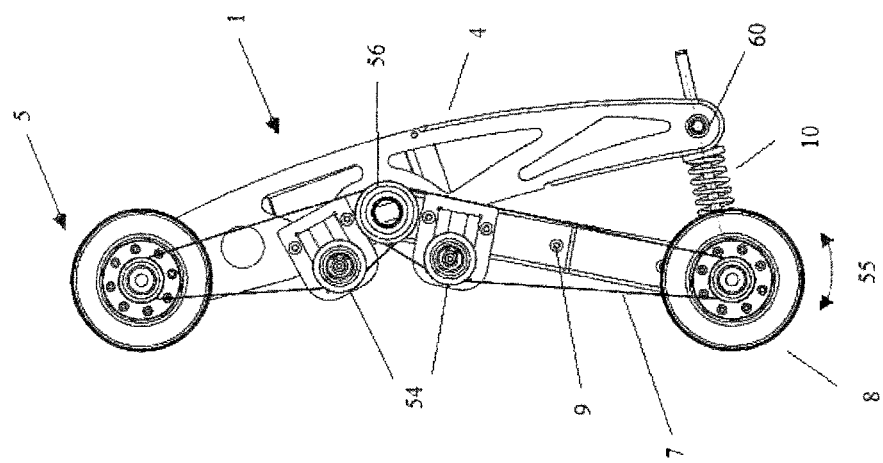

FIGS. 3a-c show side views of three respective embodiments of the driving part according to this invention.

FIGS. 4a-4c show top views of three respective embodiments of the controlling and monitoring part according to this invention.

FIGS. 5a-5c show three side views of three respective embodiments of the controlling and monitoring part according to this invention.

Figure 6A:
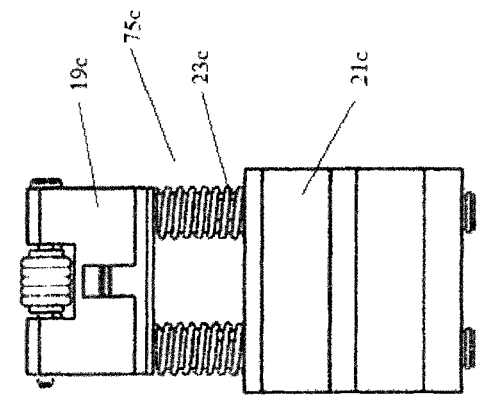
Figure 6B:
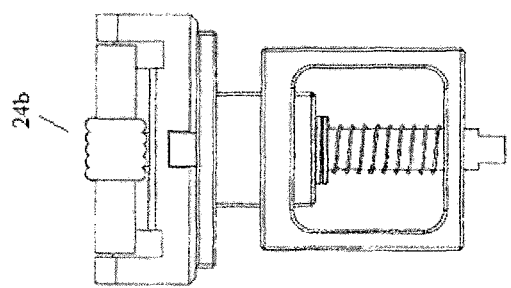
Figure 6C:
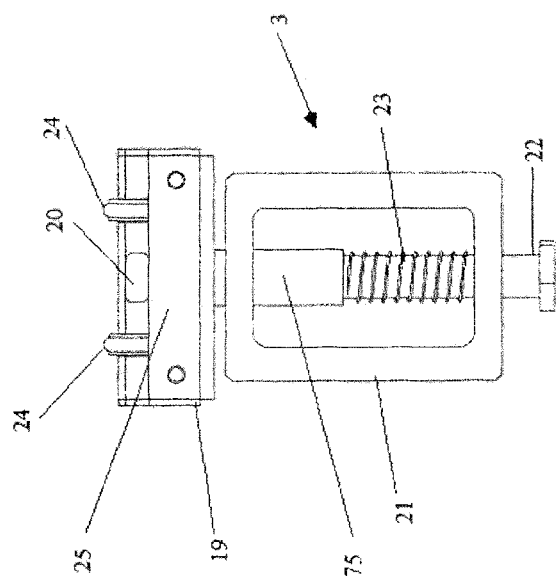

FIGS. 6a-6c show three front views of three respective embodiments of a sensor set according to this invention.

Figure 7A:
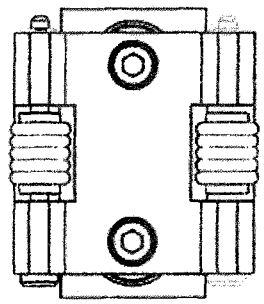
Figure 7B:
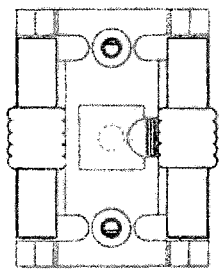
Figure 7C:
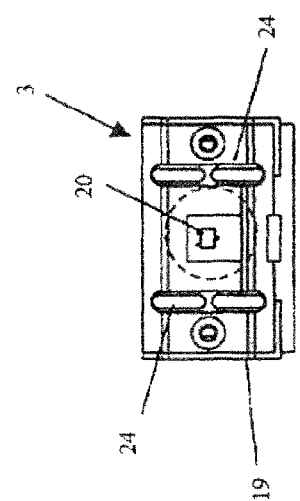

FIGS. 7a-7c show three top views of three respective embodiments of a sensor set according to this invention.

Figure 8A:
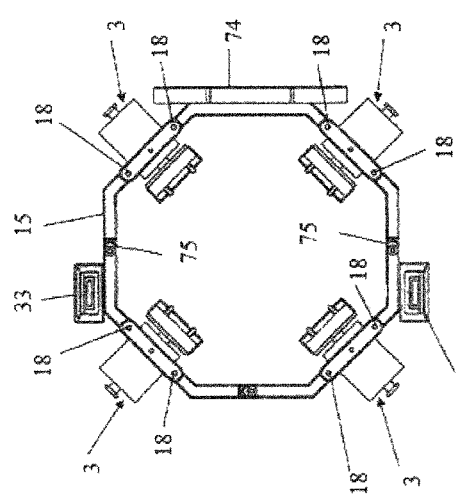
Figure 8B:
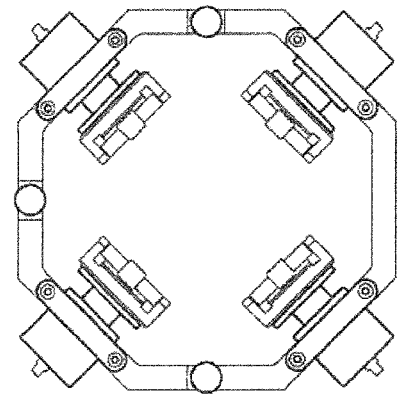
Figure 8C:
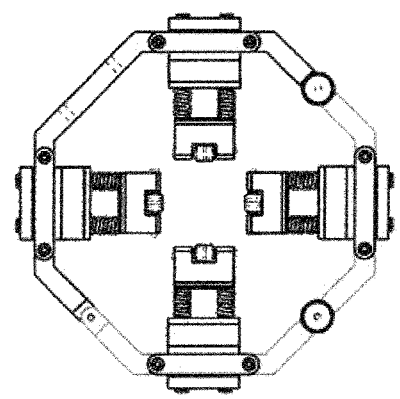

FIGS. 8a-8c show three front views of three respective embodiments of the adjustable sensor frame set according to this invention.

Figure 9A:
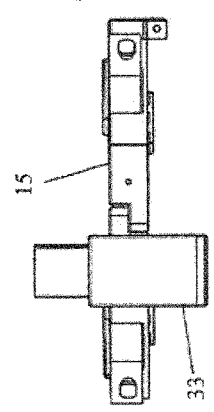
Figure 9B:
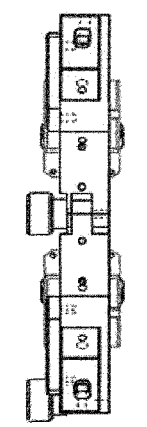
Figure 9C:
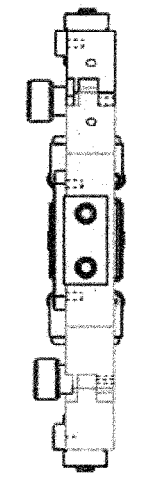

FIGS. 9a-9c show three top views of three respective embodiments of the adjustable sensor frame set according to this invention.

Figure 10:
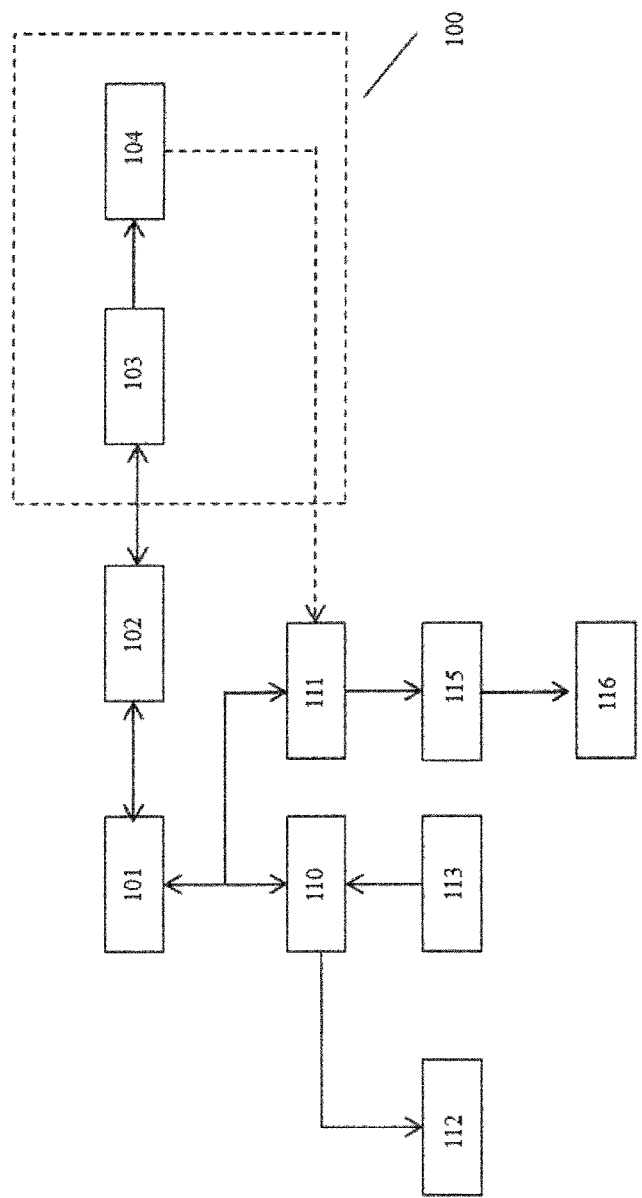

FIG. 10 shows a schematic operation diagram.

Figure 11:
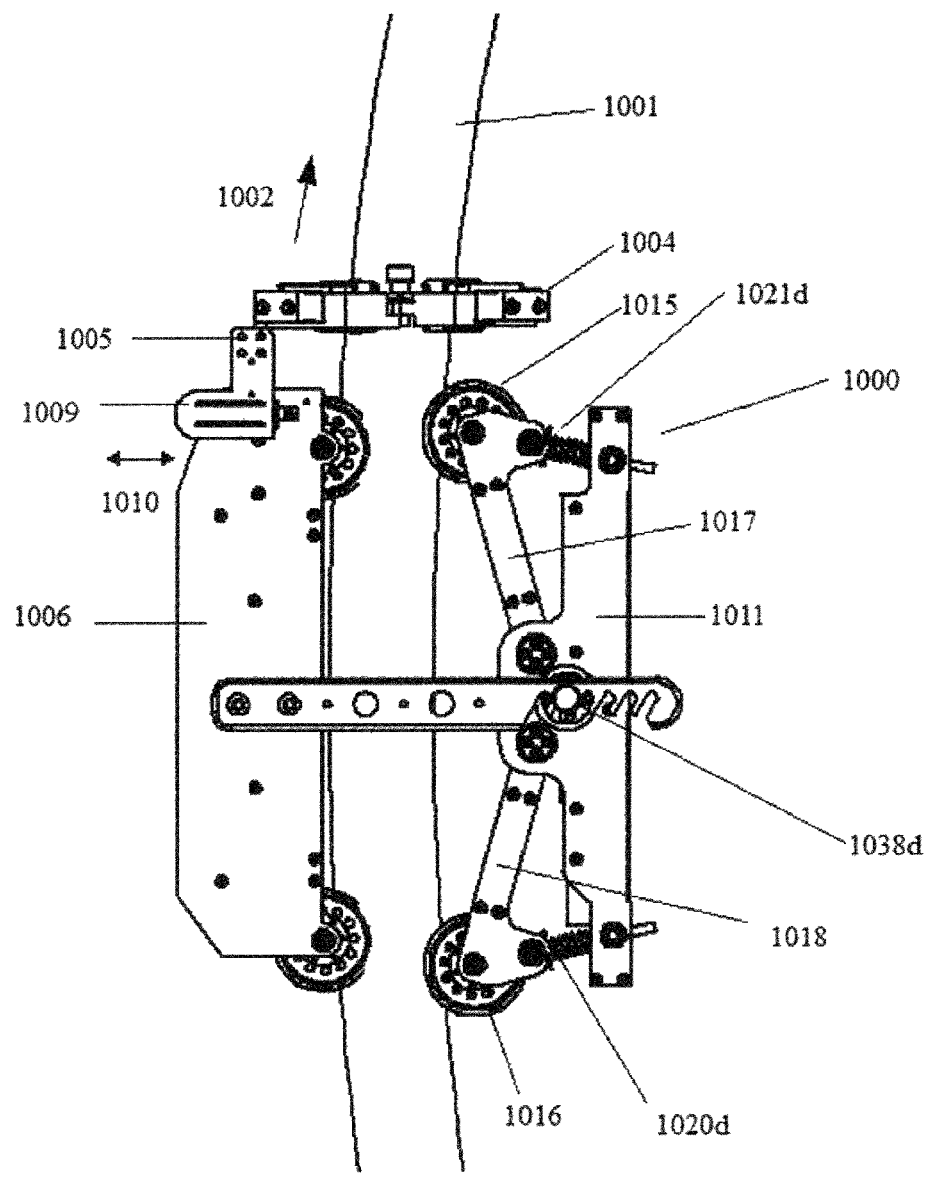

FIG. 11 shows a side view of an embodiment of the apparatus assembled on a curved tube-like object.

Figure 13:
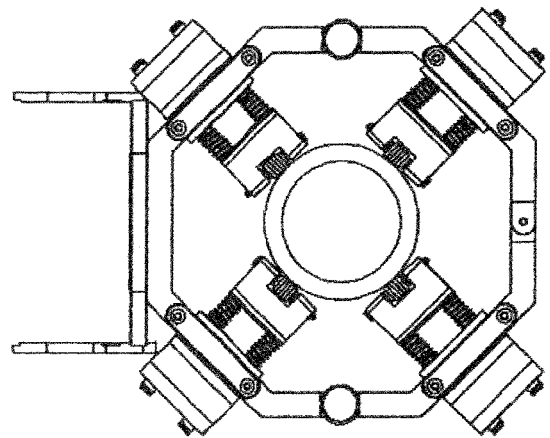
Figure 12:
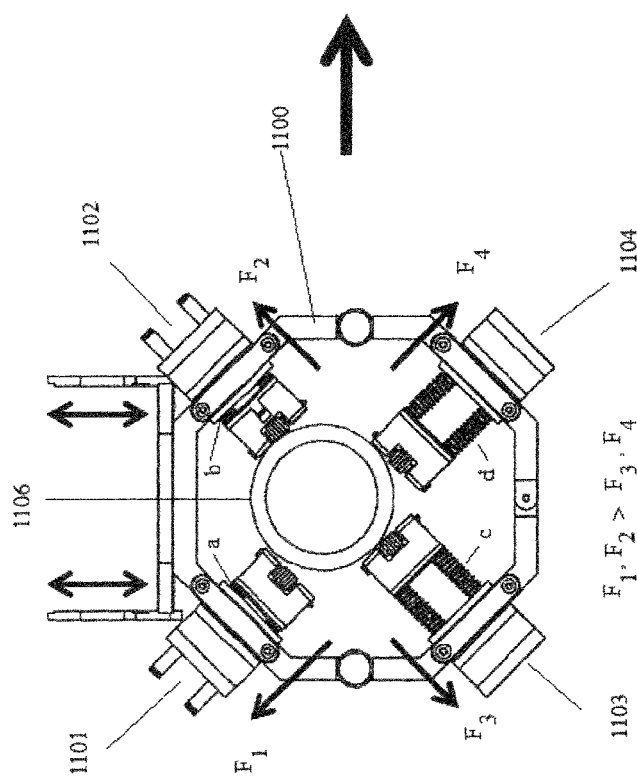

FIGS. 12 and 13 show a detailed view of a sensor frame according to an embodiment of the invention.

DETAILED DESCRIPTION

The followings describe various characteristics and more clearly advantages of movable detector according to this invention by referring to the attached drawings.

FIGS. 1a to 9a show a first embodiment of movable detector for inspecting the active equipment according to the invention. FIGS. 1b to 9b show a second embodiment, and FIGS. 1c to 9c show a third embodiment. The invention will be described primarily with reference to the first embodiment. Some adaptations will be described with reference to the two other illustrated embodiments. Similar parts in the second and third embodiments will be indicated by a reference numeral including the letter b or c respectively. However it will be clear to the skilled person that many other embodiments are possible within the scope of the disclosed invention.

The apparatus (movable detector) is suitable for inspection of the outer surface of an elongated tube-like objects such as pipes, coils and/or tubes. The active equipment, such as elongated tube-like objects, can be furnaces of olefins production, cement production or coils or tubes in the boilers of paper production and so on. Moreover, this invention could be used to investigate any features of elongated tube-like object which would like to be inspected such as straight or curve, and it also could be used to inspect the elongated tube-like object which are arranged in any directions such as vertical, horizontal, tilt and so on.

In the shown embodiment a first part 1 is arranged as driving part. It is equipped as drive and includes moving elements such as wheels to allow movement along a pipe C. A second part 2 is arranged as processing part. The processing part can perform control and monitor functions. It can control the driving part 1 by providing instructions to the drive.

In an embodiment the first driving part 1 can be assembled together with a second controlling and monitoring part 2, to inspect the active equipment C. The movable detector comprises an adjustable connection 36 that can be scaled according to the active equipment C. The movable detector comprises several sensors 3. Preferably the movable detector, more specifically a sensor frame 15 on which sensors 3 are mounted, has means for preventing instability of inspection of the sensor set during moving, that will be described together with FIGS. 6 and 7. For preventing instability of the sensor, the apparatus and preferably the sensor frame 15 comprises means for maintaining a predetermined distance between tube and sensor. Further the movable detector will have means for sending a signal to a computer to present the data instantly (real time) or the movable detector comprises a station to connect a SD card on to which measured data is stored.

Figure 1C:
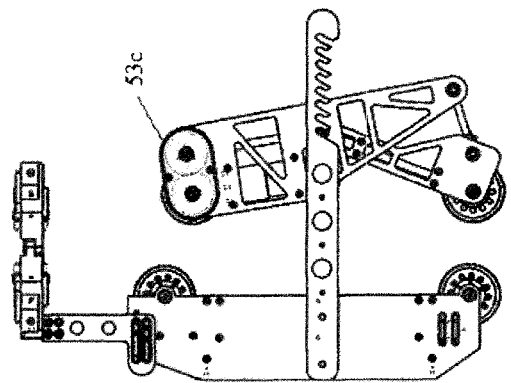
FIGS. 1a-1c show three respective embodiments according to this invention of a driving part 1 and a controlling and monitoring part 2 which can be mounted on an elongated tube-like object C that is to be inspected.
Figure 1B:
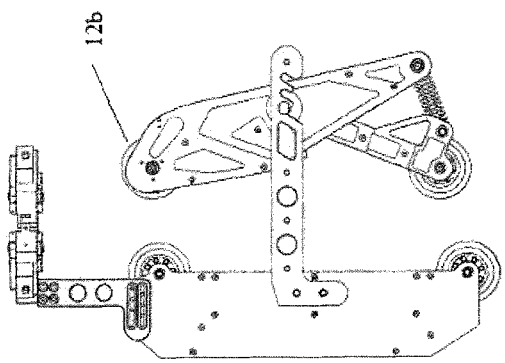
Figure 1A:
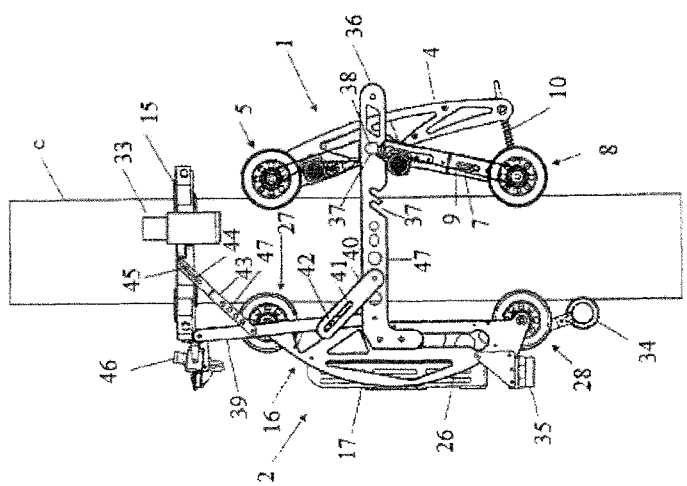

FIGS. 1a-1c show three embodiments. In the following the front part of the movable detector is the upper side of the movable detector shown in FIGS. 1a-1c. The rear is the lower part of the movable detector.

In an embodiment the movable detector for inspecting the active equipment comprises a first part, such as driving part 1 for moving along a coil or tube C of the active equipment which coil or tube is to be inspected.

Figure 2C:
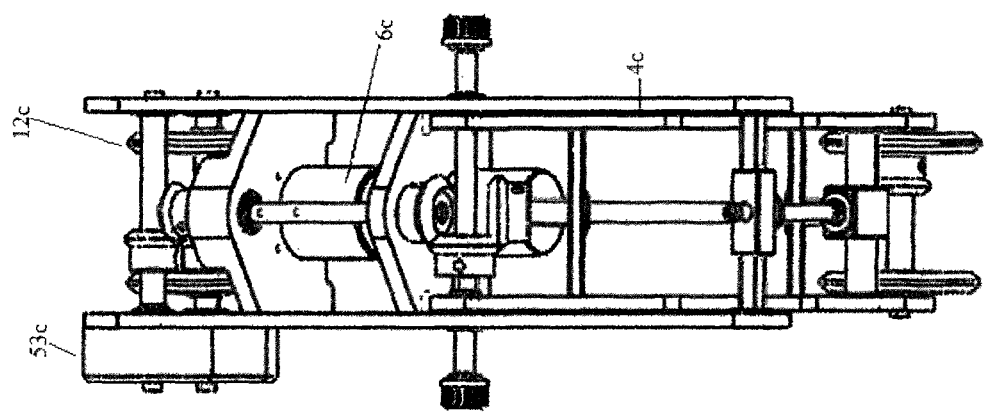
FIGS. 2a-2c show top views of three respective embodiments of a driving part according to this invention.
Figure 2B:
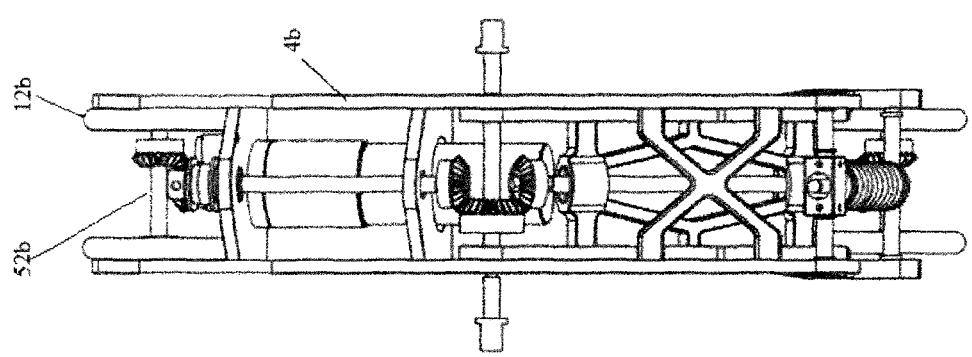
Figure 2A:
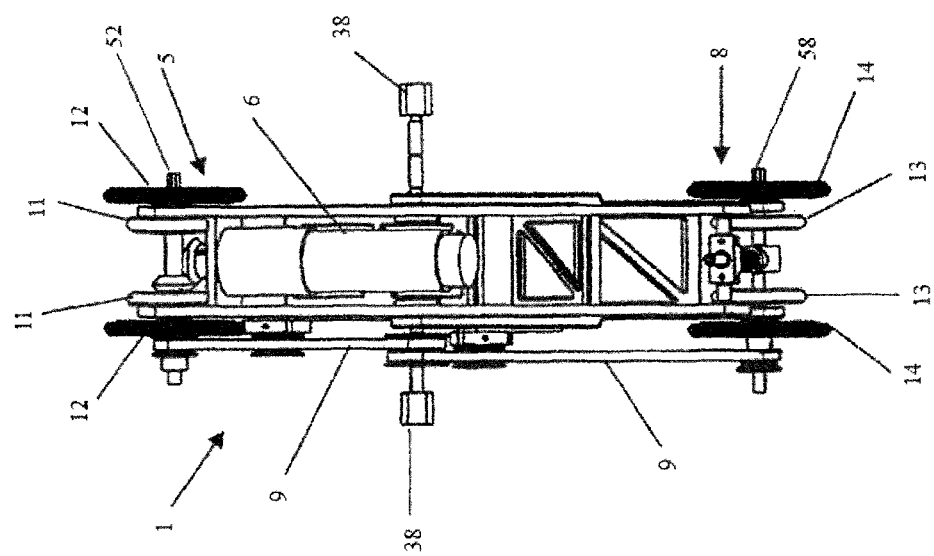

FIGS. 1-3 show the driving part 1 according to three respective side views. The first embodiment comprises:

a first wheel frame 4 onto which front wheels 5 are mounted;

a motor 6 for driving front wheels 5;

a second wheel frame 7, onto which rear wheels 8 are mounted;

a transmission belt 9 for transferring power from front wheels 5 to rear wheels 8; and a wheel pusher 10 which is installed between a shaft 51 of rear wheels 8 and at the rear ea of the first wheel frame 4.

First wheel frame is an example of a frame that can be part of the first part or driving part 1 of the movable detector. The first wheel frame 4 allows mounting of front wheels 5, which are an example of a possible embodiment to allow the movable detector to move along the tube or coil C. In another embodiment a caterpillar can be used instead of wheels 5. Wheels 5 are mounted on the frame by a shaft 52. The wheels can comprise inflatable tires.

In an embodiment the front wheels 5 comprise a set of small wheels 11 and a set of big wheels 12, which are arranged on the same shaft 52. The set of small wheels 11 is arranged between set of bigger wheels 12. Similarly rear wheels 8 comprise a set smaller wheels 13 and bigger wheels 14, which are arranged on the same shaft 51, the smaller wheels being arranged between bigger wheels 14, as shown in FIG. 2. Providing front wheels 5 and rear wheels 5, 8, which comprise a small set of wheels 11, 13 and a big set of wheels 12, 14 respectively make it able to be used with various sizes of tube-like object C. Inspection of different sized tubes or coils can be done quickly and easily without wheels replacement to be suit with the size of tube-like object C. For example, if the tube-like object C has small pipes or coils such as diameter 2 inches, it could be applied small set of wheel 11, 13 or if the active equipment C are pipes or coils with the big size such as diameter 4 inches, also could be applied the big set of wheel 12, 14 and so on.

Another embodiment of the driving part 1 can comprise:

a first wheel frame (4) comprising a first subset of wheels (5);

a second wheel frame (7) comprising a second subset wheels (8);

a motor (6) for driving both the first subset of wheels (5) and the second subset of wheels (8); and a gear and shaft for transferring power from the first subset of wheels to the second subset of wheels, wherein preferably the gear and shaft is arranged on the same shaft as the first subset of wheels.

In this embodiment, the motor 6 drives both the front and the back wheels via a gear and shaft. Hereto, the gear and shaft can be positioned at the center of the front, first wheel frame 4. The result thereof is the reduction of power transferring parts. The motor can be placed in the center of the first wheel frame 4. The result thereof is that the motor can drive both the front, first subset wheels 5 and the back, or second subset wheels 8. In another embodiment, wedge or pin connections can be used instead of a screw, for connecting the gear with the shaft. The advantage hereto is to reduce loss of power during power transmission. In a further embodiment, biasing (pushing) elements such as springs can be added to both, the front wheels and the back wheels of the driving part 1.

Preferably, the apparatus may have a gear set for power transmission instead of a belt to reduce consumable part and more reliability. More preferably, the apparatus may have a motor driven gear positioned at the middle to transmit power to the top and the bottom of wheels and in this way avoid stress on the top side. Most preferably, the motor may drive the gear positioned at the middle and transmit power to the top and the bottom of wheels. This can provide more balance, less stress and can keep the distance of apparatus in respect to tube-like object using a spring to absorb force on both of the top and the bottom of wheel sets. Moreover, the latest configuration can automatically adjust itself by the spring mechanism through the curved tube-like object (see FIG. 11).

In embodiments, the first and the second wheel frames are pivotably connected to the first part 1. Further both the first and the second wheel frame are connected to the first part over pushing elements, so that both, the first and the second wheel frame are pushed towards the tube.

In the second and third embodiment the different sized wheels are absent. As seen in the second and third embodiment the wheels 12b, 12c are positioned internally of the frame 4b,4c respectively. By moving the wheels inward, the wheels 12b, 12c can be combined with more different sized equipment C.

On the frame 4 of first part 1 a motor 6 is mounted. The motor 6 is arranged for driving front wheels 5. A transmission connects to motor shaft to the shaft 52 of the front wheels 11,12. The motor 6 can be an electric or combustion motor. The motor 6 can be remotely controlled. The motor 6 is an example of a drive that can be used for the movable detector according to the invention.

The third embodiment, FIGS. 1c and 2c, shows a transmission 53c, that can comprise gears to transmit the drive power onto the front wheels 11,12.

In the first embodiment a transmission belt 9 transfers power from front wheels 5 to rear wheels 8. The transmission belt 9 is tensioned using tension wheels 54. Clearly other embodiments for transferring power to the rear wheels 8 are possible. In an embodiment separate drives for the front and rear wheels are present. In an embodiment, instead of the transmission belt, a gear and a shaft are used for transferring power.

The rear wheels 8 are mounted on a shaft 51 that is connected to second wheel frame 7,7b,7c by bearings. Second wheel frame 7 can pivot according to arrow 55,55b, 55c around an axis 56,56b,56c extending out/into the paper. A wheel pusher 10 connects the second wheel frame 7 to the first wheel frame 4 of the driving part 1. The wheel pusher 10 has bearings 60,60b,60c. The wheel pusher 10 pushes the second wheel frame 7 and accordingly rear wheels 8 to clamp the active equipment C. The wheel pusher also effects the front wheels 5 and the front wheels 27 and rear wheels 28 mounted on the second frame 2 to clamp the tube/coil of the active equipment C. The connection arm 36 of suitable length transfers the engaging power. Wheel pusher 10 can comprise a spring or any similar devices that exert a biasing force towards a default position. In an embodiment the wheel pusher 10 can be embodied by a controllable lever that can be controlled by a device controller. This will allow configuring the amount of the pivoting of the second frame part 7 with respect to first frame part 4 and will allow configuring the movable detector for engaging a tube-like object of a predetermined size. Further control allows configuring the gripping/engaging force of the movable detector onto the tube-like object C.

In an embodiment the movable detector for inspecting the tube-like object comprises a second part, such as controlling and monitoring part 2 for moving along the elongated tube-like object C of the active equipment which coil or tube is to be inspected.

In an embodiment the second part is arranged as controlling and monitoring part 2 for controlling the movement of driving part 1. The second part can comprise devices arranged for inspection, measurement and evaluation of measured data.

In an embodiment the second part 2, as shown in FIGS. 1, 4 and 5, comprises inter alia:

a wheel frame 16 for motion supporting, which is connected to the removable and adjustable sensor frame set 15 by an adjustable connection;

a removable and adjustable sensor frame set 15; and a controlling and transceiver set 17, which is mounted to the wheel frame 16 for motion supporting.

Three embodiments of the invention are shown in the respective FIGS. 1,4 and 5. In a first embodiment wheel frame 16 for motion supporting comprises:

a frame 26;

front wheels 27, which are arranged at the front of frame 26;

rear wheels 28, which are arranged at the rear end of frame 26;

According to this invention, front wheels 27 comprise a small wheel set 29 and a big wheel set 30. The front wheels are arranged on the same shaft 62. The small wheel set 29 is arranged between the big wheel set 30. Further rear wheels 28 are similar mounted using bearings on a shaft 63 to the wheel frame 16. Small wheel set 31 is arranged between big wheel set (32). The big and small wheels allow engaging different sized tube-like objects.

The shafts 62,63 of the front and rear wheels 27,28 have a fixed position with respect to the frame 26.

In the second and third embodiment frame 26b and 26c is more closed. This prevents entry of dust into the second part 2, which in turn prevents damage e.g. to the electrical circuits.

According to the invention an adjustable connection system 70, 70b, 70c connects the first part 1 and second part 2 of the movable detector.

The adjustable connection system 70 can comprise, as shown in FIGS. 1 and 5 a first set of connection arms 36, of which one end is fixed to wheel frame 16 of second controlling and monitoring part 2 and of which the other end can be connected to the first wheel frame 4. The connection to the first part 1 can be removable and adjustable. In particular a rigid arm 36 is provided with spaces 37 for making a connection to a locked axis 38, which is mounted to the wheel frame 4. The multiple spaces 37 allow fixing the first part 1 and second part 2 at predetermined distance from each other, which predetermined distances can be configured in accordance to the size of the coils or tubes that are to be inspected.

Arm 36 can be provided with holes 47 for weight reduction.

Mounting arm 36 to the second wheel frame 26 can be by one of suitable connection means known to the skilled man. In an embodiment a locking and unlocking fixation is used.

The adjustable connection system 70 can further comprise a second set of connection arms 39. One end of the connections arms 39 can be connected with sensor frame set 15 over a pivoting bearing and the other end can be pivotably connected to first connection arm 36. A third set of connection arms 40, of which one end is connected to the first connection arm 36. Near the other end is a slit 41 is provided in which a control axis 42 of the second connection arm 39 is guided. Further a fourth set connection arms 43, of which one end is fixated to the second connection arm 39 and the other end is provided with a slit 44 in which is control axis 45 is guided. The control axis 45 is fixed to the removable and adjustable sensor frame set 15.

Providing the adjustable connections, such as the slits 41,44, allow quick and easy adjusting the driving part 1 and the controlling and monitoring part 2 to the active equipment C.

The sensor frame 15 with sensors units 3 is connected via the one or more body-to-sensor-frame connections 39, 40, 43, 72b, 72c to the first and second frame parts.

The body-to-sensor-frame connections comprises connection arms 39,40, 43 allow adjusting the position of the removable and adjustable sensor frame 15 with respect to the second part 2. The body-to-sensor-frame connections do not fix the position of the sensor frame completely with respect to the body, but allow at least one degree of freedom, in at least one direction perpendicular to the main direction of the tube. This allows maintaining the sensor frame 15 at a position in relation to the coils or tubes, even if these coils/tubes are bent. Positioning units on the sensor frame or on the one or more sensors make use of this degree of freedom to position the sensor frame or sensors with respect to the tube, preferably in accordance to a predetermined relationship. This allows maintaining the sensors at a predetermined position with respect to the surface of the coils/tubes, which in turn does not influence the measured properties of the tubes/coils.

In the second and third embodiment body-to-sensor-frame connections 39,40,43 are removed and replaced by a one axis slit 72b and 72c, which slidably mounts arm 39b and 39c respectively. The slits 72 and arm 39 form the body-to-sensor-frame connections. The sensor frames 15b and 15c are connected to the arms 39b and 39c respectively.

The one or more connections allow relative movement of the sensor frame 15 with respect to the frame parts 1,2. As will be discussed below, the sensor frame 15 and sensor units 3 according to an embodiment of the invention provide a self-centered positioning mechanism, which will position the sensor frame 15 with respect to the tube C. The body-to-sensor-frame connections comprising arms 39,40,43 and slits 72b,72c provide a general position of the sensor frame 15 with respect to the frame parts 1,2, while the sensor frame 15 with mounted units 3 engages the elongated tube-like object C to fine-tune positioning with respect to the tube-like object C.

The self-centering constellation of the sensor frame 15 allows that the sensor frame 15 moves with respect to the first and second frame parts 1,2, not only due to uneven surface of the clamp tube-like object, but also as a result of bends in the elongated tube-like object. Even when a sharp curve is present in the tube, the sensors unit 3 will be held at predetermined positions/distances from the surface of the tube-like object, which in turn results in a stable acquisition of the state indication signal with the sensors representing a state indication property of the tube surface.

In an embodiment the movable detector for inspecting the active equipment comprises one or more sensors 3 for inspecting a coil or tube C of the active equipment. The sensors 3 can be mounted on a sensor frame 15. Examples of the sensor frame 15,15b,15c are shown in FIGS. 8a-9c respectively.

The sensor frame 15,15b,15c is detachable from the movable inspection robot. In an embodiment the sensor frame 15 is connected to the second part 2. The sensor frame 15 comprises a connection bar 74.

FIG. 8a shows four sensor units 3 installed on the removable and adjustable sensor frame 15 using screws 18. The sensor units 3 are mounted in a position that consistent with the size of elongated tube-like object C which is to be inspected. The screws 18 can allow positioning the sensor at different positions. Two, three, four or more sensors can be mounted on the sensor frame 15. Preferably a balanced position of sensors around the tube-like object is applied.

The sensor frame 15 allows surrounding the tube or coil C. The sensor frame 15 has a locking/unlocking system 75, such that the sensor frame 15 can be closed to surround the coil/tube completely. This closed sensor frame is more rigid.

In an embodiment the removable and adjustable sensor frame 15 has the feature that the frame can be disassembled into parts. The sensor frame can be assembled in a desired configuration and adapted to the tube-like object C which is to be inspected.

A further benefit of providing a replaceable sensor frame 15 is that different frames 15 can be available for various sizes of active equipment C. It is also possible to mount only a part of the frame with a limited number of sensors. In the shown embodiments four sensors 20 in four sensor units 3 are used, mounted on a single sensor frame 15.

Further the sensor frame 15 can be used with the active equipment, which has a limited spaces for positioning the movable detection robot. For example, when pipes or coils are to be inspected that have limited space around it, e.g. of about 2 inches, one of the sensors 20/sensor units 3 can be removed from the sensor frame 15, such that three sensors 20 remain. The sensor frame provides flexibility during use and could investigate the active equipment faster and also shorten working time.

An embodiment, as shown in FIGS. 6a and 7a, shows a sensor unit 3 that comprises
  a sensor housing 19;
  a sensor 20, which is positioned at the front of sensor housing 19;
  a spring housing unit 21;
  a spring 23 biasing arm 75 in a direction 76;
  permanent magnet 25; and
  wheels 24.

Wheels 24, permanent magnet 25 and sensor 20 are mounted on the sensor housing 19. Permanent magnet 25 creates a magnetic field. The magnetic field pass through the sensor 20 and through the material of the elongated tube-like object C that is to be inspected. The permanent magnet 25 is arranged behind sensor 20, as shown in FIG. 7.

Spring housing unit 21 is mounted to the sensor frame 15. Screw 18 can be used for this connection.

In spring housing unit 21 a screw 22 is provided that allows configuring a biasing force exerted by spring 23 that biases arm 75 in the direction 76. The spring 23 will prevent instability of inspection. The spring will push the sensor 20 in the direction the tube/coil C. The wheels 24 will clamp the tube-like object and will position the sensor 20 at a predetermined distance from the coil/tube. This will allow measuring a state indication property of the tube/coil at a predetermined distance and thus under similar circumstances during use of the movable detector.

Clearly different configurations are possible to position the sensor and permanent magnet at a predetermined distance from the surface of the coils/tubes of the equipment.

Other embodiments are shown in FIGS. 6b and 7b and 6c and 7c. The second embodiment shows four wheels 24b positioned centrally. This will allow positioning the sensor 20/magnet 25 at a predetermined position for more different sized tubes/coils.

The third embodiment shows a sensor housing 19c that will be held at a predetermined position with respect to the coil/tubes by two arms 75*c* and springs 23*c* that are connected to the spring housing unit 21*c*.

Although some of the shown embodiments are directed at sensors for investigating contamination of the tubes/coils in the active equipment C by measuring the amount of carbon in coils/tubes, the invention is not limited to these kind of sensors.

In an embodiment a touch sensor 33, shown in FIGS. 1 and 8, is also mounted on the sensor frame 15. The touch sensor 33 is arranged to sense when the sensor frame 15 collides with an obstacle. The touch sensor 33 can arranged to control the movement of movable detector, such that when the sensor measures a collision with an obstacle at the front, the movable detector is stopped. Collection of data can be stopped. Also the movable robot can move back automatically. In another embodiment the robot stops moving.

In an embodiment the movable detection robot comprises a control and transceiver unit 17. The control and transceiver unit 17 can be mounted on the second part 2 and can comprise:

an inclination sensor,
a microcontroller; and
a transceiver.

In an embodiment the inclination sensor measures bending of the elongated tube-like object C. In an embodiment the curve of the elongated tube-like object is determined.

In an embodiment the microcontroller is arranged to receiving data from sensor 20, data from the touch sensor 33, data from the inclination sensor, data from the distance measurement sensor 34 and data from the ultrasonic sensor 35. In an embodiment the microcontroller is arranged for processing data to control the movable detector. In an embodiment a program from a memory is available in microcontroller. The program can control the driving (moving) of the detection robot. In an embodiment the microcontroller is arranged to transfer data to a transceiver.

In an embodiment the microcontroller is arranged to receiving commands from an operator, e.g. through the transceiver. The commands from the operator are directed at controlling the operation of movable detector.

In an embodiment the transceiver receives commands from an operator. The command can be sent to the microcontroller. The transceiver can receive data from microcontroller, and send the data to the controller. The data can comprise state indication parameters measured by the sensors 20 and can comprise information with respect to the driving and operation of the movable robot.

In an embodiment the movable detection robot further comprises a distance measurement sensor 34 for measuring the moving distance of movable detector. Data measured by the sensor 34 can be used as feedback data that is sent to the operator via the transceiver.

Further the movable detection robot can comprise an ultrasonic sensor 35. The ultrasonic sensor 35 is an example of a sensor that can be arranged to prevent a collision of the robot with an object. The sensor 35 uses ultrasonic waves.

Sensors 34 and 35 are near an rear end of frame 16. Clearly other positions are also possible. Sensor 35 senses in the backward direction.

In an embodiment a video camera 46, as shown in FIGS. 4 and 5, is arranged at on the sensor frame 15. The video camera 46 can provides visual feedback to an operator. The video camera allows visual inspection of remote locations of the active equipment. The camera can be used for inspecting external conditions of active equipment C, which can include swelling and distortion of active equipment C.

In an embodiment the first and the second wheel frame 4, 7, the sensor frame 15, and the wheel frame 16 as well as the connection arms 36 and the connection arms 43 are provided with holes for weight reduction. This reduces the weight of the movable detector, such that it consumes less power and can work more flexibly.

FIG. 11 shows an embodiment of an apparatus 1000 arranged at a curved tube-like object 1001. The apparatus 1000 can move in direction 1002 over the tube 1001. Since tube 1001 is bended, this direction 1002 is not straight. As the apparatus 1000 clamps, similar to other embodiments, the tube 1001, and the apparatus has a drive (not shown in detail), the apparatus 1000 will have a position along the tube 1001 in direction 1002.

A sensor frame 1004 is connected via a body-to-sensor-frame connection 1005 to part 1006 of apparatus 1000. Due to the connection 1005, the sensor frame is held ahead of the apparatus 1000. The position of the apparatus 1000 along direction 1002 thereby determines the position of the sensor frame 1004 along the direction 1002.

The body-to-sensor-frame connection 1005 provides a degree of freedom in direction 1010 by comprising slits 1009. This allows the sensor frame to move in direction 1010 with respect to the part 1006. Further slits can be present to provide a further degree of freedom, e.g. slits extending in a direction into the paper of FIG. 11. The combined two degrees of freedom are generally perpendicular to the to the direction 1002 of the tube, allowing to move the sensor frame in a plane perpendicular to the direction 1002. This is illustrated in FIGS. 12 and 13.

In embodiments, the apparatus can reduce stress from the series of gear transmission and also balance power through the wheels on the top and the bottom of apparatus. At the driving part 1011, gear box at 1038*d* can transmit power through a shaft and then to the wheels 1015,1016 on the top and the bottom of apparatus.

Wheel frames 1017,1018, which mount the wheels 1015, 1016, are pivotable connected to the gear box 1038*d*. Spring 1020*d* and a similar and/or the same spring 1021*d* bias the wheels 1015,1016 on to the tube, the apparatus balancing itself along the tube-like object. The apparatus can also maintain the position as the spring will shrink and expand along the curved tube-like object. This design also allows the controlling part 1006 to also move along.

FIG. 12 shows a detailed view of a sensor frame 1100 of an apparatus, arranged at a curved and/or uneven (outer surface of an) elongated tube-like object 1006. The apparatus 1000 can move in a direction extending in a direction into the paper (see 1010 of FIG. 11), this is because the apparatus moves along the length of the tube. Since tube 1106 is bended, this direction into the paper is not straight.

The tube is engage surrounded by the sensor frame 1100. Four sensor units (1101-1104) are arranged on the sensor frame. The sensor units have biasing elements, e.g. springs. When the apparatus is climbing on the bended or uneven tube, unbalanced forces apply. As a matter of a result of this action, the spring loads on each sensor are not the same. This offset position results then in a re-action of the spring forces (F1-F4) of the corresponding sensor units. Here, the sensor frame 1100 is adjusted by the forces F1, F2 of sensor units 1101, 1102 respectively, which can be greater than the forces F3, F4 of sensor units 1103, 1104 respectively.

To self-center the tube the springs sets (a-d) of the sensor units and/or sensor frame moves back to the balanced position. Due to the above-discussed degree of freedom provided by the body-to-sensor-frame connection, the sensor frame is allowed to move in the X and Y directions of FIGS. 12 and 13 due to the provided degrees of freedom by the body-to-sensor-frame connections, in an embodiment formed by slits. The self-centered position of the tube is shown on FIG. 13. Here, all springs maintain at an equal distance to the center of the tube. The embodiment of the curved or uneven tube shown on FIG. 12 and FIG. 13 is not exhaustive in terms of force, number of sensors, configuration of sensor frame, etc. The embodiment of FIG. 12 and FIG. 13 can be combined with the embodiment of FIG. 11.

The end result will be at the center position as shown in FIG. 13.

According to another feature of this invention, methods for inspecting tube-like object provided. The method can comprise the following steps:

assembling the movable detector onto and/or around tube-like object C that is to be inspected; an adjustable connection is assembled; the distance between two frame parts 1,2 can be scaled according to the size of tube-like object; assembling can comprise connecting a rigid arm 36 extending from a second frame part 2 to an axis 38 of the first frame part 1, the connecting comprising positioning an axis 38 in a corresponding space 37 in the arm 36.

moving the movable detector along the tube-like object C that is to be inspected and performing measurements and possibly evaluation of the measured data.

According to this invention, the movable detector is arranged to inspect the tube-like object C that is to be inspected while the detection robot is moving along the active equipment. The sensors 3 are mounted on a sensor frame. The frame or the frame mounting or the sensor housing comprises means that preventing instability of inspection while moving for inspecting. The sensors 3 can be arranged to send a signal to a computer for presenting the data instantly (real time). In a preferred embodiment data is recorded on an SD card that is connected to an electronic circuit on the movable robot. The SD card can be removed and inserted in a slot of a computer to allow subsequent processing of the measured data.

According to an aspect a method for inspecting active equipment is provided that uses the movable detector, which has one or more of the features as mentioned above.

As the details mentioned above, it is clearly that the movable detector and method for inspecting the active equipment according to this invention have several advantages and benefits. In an example, the movable detector can be configured to the various sizes of active equipment that are to be inspected. The assembling can be done quickly and easily.

Further or additionally, the movable detector is also arranged to maintain the distance between the surface of the active equipment and one or more sensors constant while moving. The result will be that a stable measurement is performed, no matter whether the surface of active equipment is bent, convex or rough. Precise information is continuously and rapidly obtained and fed e.g. to a microcontroller and/or a transceiver.

FIG. 10 schematically shows control by and feedback to an operator. An operator has a computer 101. The computer comprises a wireless router 102 that is arranged to send and receive data over a wire connection to and from the movable detection robot 100 schematically indicated by dotted lines. The robot 100 has a transceiver 103. The transceiver 103 can send data to the computer 101. The transceiver 103 can be connected to a microcontroller as discussed above. The microcontroller can be connected to one or more of the sensors and/or to the drive for controlling moving. Further a memory unit 104 with a memory card can be present on the robot 100. The memory can store a copy of the data that is sent and received by the transceiver 103. The memory card can be read out after an operation.

The computer 101 provides the operator with information and allows control of the robot 100. The computer 101 is arranged to execute software/program code. Two programs 110, 111 are shown. Control software 110 allows an operator to view 112 status data received from robot 100. As a result of the feedback data the operator can input an instruction 113 that is subsequently sent to the robot in order to control actions by the robot. An instruction can be to stop moving or to increase the speed of moving of the robot 100.

Analysis software 111 on computer 101 allows receiving the measured data by sensors 3. That same software 111 can have a part 115 that is arranged to process the received data. The processing software 115 is arranged to calculate on the basis of information received from the sensors 3 and in combination with position data received from sensor 34 positions of the coils/tubes that have a reduced remaining life time. The processing software 115 is able to process the received data that provides a state indication property and convert it into information that the operator can use. Processing software has an export functionality 116, e.g. displaying the report information on a display or exporting data into a file that can be used subsequently.

Within the scope of this disclosure many modifications are possible for the components of the movable detectors mentioned above.

The invention claimed is:

1. An apparatus mounted around an elongated tube-like object for inspecting said elongated tube-like object, the apparatus comprising:
a body (1, 2) for moving along the elongated tube-like object while clamping an outer surface of the tube-like object; and
a sensor frame (15, 15b, 15c) supporting one or more sensors (20) for measuring a state indication property, wherein the sensor frame (15, 15b, 15c) comprises two or more engaging elements at different positions on the sensor frame, wherein the engaging elements are configured to engage the elongated tube-like object at different locations, wherein the engaging elements comprise one or more biasing elements (23c) for exerting a force onto a surface of the elongated tube-like object and position the sensor frame with respect to the elongated tube-like object; and
one or more body-to-sensor-frame connections (39, 40, 43, 72b, 72c) for connecting the sensor frame (15, 15b, 15c) to the body (1,2),
wherein the body-to-sensor-frame connections (39, 40, 43, 72b, 72c) are arranged to allow an adjustable relative position between the sensor frame and the body and arranged to allow maintaining a position of the one or more sensors (20) with respect to the tube-like object.

2. The apparatus of claim 1, wherein the apparatus comprises means for maintaining a predetermined distance between the one or more sensors (20) and the tube-like object, wherein the distance is measured in a radial direction from the pipe.

3. The apparatus of claim 1, wherein the sensor frame comprises a positioning unit that allows positioning the sensor frame with respect to the tube.

4. The apparatus of claim 1, wherein the body that clamps the tube is arranged to position the body along a non-linear tube in a first direction, and wherein the body-to-sensorframe connections are arranged to position the sensor frame at a position in that first direction at a position ahead or behind the body.

5. The apparatus of claim 1, wherein the body-to-sensor-frame connections are arranged to hold the sensor frame rotationally fixed with respect to the body and/or the tube.

6. The apparatus of claim 1, wherein the one or more biasing elements (23c) is one or more springs (23c), for asserting a restoring force against the elongated tube-like object.

7. The apparatus of claim 1, wherein one or more sensor units (3), each comprising the sensor (20), are mounted on the sensor frame (15), wherein the sensor unit (3) comprises an elongated tube-like object engaging element, that also comprises a biasing element that are arranged to position the sensor at a predetermined distance from the surface of the elongated tube-like object.

8. The apparatus of claim 1, wherein the body comprises:
a first part (1) comprising a first set of tube-like object clamping means;
a second part (2) comprising a second set of tube-like object clamping means;
a connection arm (36) for connecting the first part and the second part at a distance adapted to the size of the tube.

9. The apparatus of claim 8, wherein the first part (1) comprises:
a first wheel frame (4) comprising a first subset of wheels (5);
a second wheel frame (7) comprising a second subset of wheels (8),
wherein the first and second wheel frames are pivotably connected to each other or to a connection arm (36), and/or wherein the first wheel frame (4) and/or the second wheel frame (7) comprises a pushing element (10) for asserting a biasing force against the second wheel frame, the first wheel frame and/or the first part.

10. The apparatus of claim 9, wherein the first part (1) comprises:
the first wheel frame (4) comprising the first subset of wheels (5);
the second wheel frame (7) comprising the second subset wheels (8);
a motor (6) for driving the first subset of wheel; and
a transmission (9) for transferring power from the first subset of wheels to the second subset of wheels, wherein the transmission (9) is arranged on the same shaft as the first subset of wheels.

11. The apparatus of claim 8, wherein the first set of tube-like object clamping means is wheels (5) and the second set of tube-like object clamping means is wheels (27,28).

12. The apparatus of claim 1, wherein a magnet element (23) is mounted on the sensor frame (15, 15b, 15c) for generating a magnetic field and the one or more sensors (20) are arranged to measure a change in the magnetic field.

13. A method for inspecting an elongated tube-like object, the method comprising:
inspecting the elongated tube-like object using an apparatus of claim 1 that is clamped onto the tube-like object;
driving the apparatus along the elongated tube-like object;
positioning one or more sensors (20) to inspect the elongated tube-like object by connecting the sensor to the driven apparatus for following the driving along the elongated tube-like object and engaging the elongated tube-like object to maintain a distance between the sensor and the elongated tube-like object.

14. The method of claim 13, wherein maintaining the distance between the sensor and the elongated tube-like object comprises asserting a restoring force against the elongated tube-like object.

* * * * *